(12) United States Patent
Jha et al.

(10) Patent No.: US 11,305,689 B2
(45) Date of Patent: Apr. 19, 2022

(54) AIRCRAFT PASSENGER READING LIGHT

(71) Applicant: Goodrich Lighting Systems GmbH, Lippstadt (DE)

(72) Inventors: Anil Kumar Jha, Lippstadt (DE); Jens Leuschner, Moehnesee (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 17/077,297

(22) Filed: Oct. 22, 2020

(65) Prior Publication Data
US 2021/0122290 A1   Apr. 29, 2021

(30) Foreign Application Priority Data

Oct. 25, 2019 (EP) .................................. 19205360

(51) Int. Cl.
| | |
|---|---|
| B60Q 3/44 | (2017.01) |
| B60Q 3/76 | (2017.01) |
| B60Q 3/47 | (2017.01) |
| B60Q 3/82 | (2017.01) |
| B64D 11/00 | (2006.01) |
| B64D 11/06 | (2006.01) |

(52) U.S. Cl.
CPC .............. B60Q 3/44 (2017.02); B60Q 3/47 (2017.02); B60Q 3/76 (2017.02); B60Q 3/82 (2017.02); B64D 11/00 (2013.01); B64D 11/06 (2013.01); *B64D 2011/0053* (2013.01); *B64D 2203/00* (2013.01)

(58) Field of Classification Search
CPC combination set(s) only.
See application file for complete search history.

(56) References Cited

U.S. PATENT DOCUMENTS

| | | |
|---|---|---|
| 6,796,690 B2 | 9/2004 | Bohlander |
| 7,253,744 B2 | 8/2007 | Colacecchi |
| 7,661,848 B2 | 2/2010 | Ginnewig et al. |
| 7,909,398 B2 | 3/2011 | Ling |
| 8,348,455 B2 | 1/2013 | Kessler |
| 8,556,478 B2 | 10/2013 | Riedel et al. |
| 8,876,342 B2 | 11/2014 | Wimbert et al. |
| 9,045,079 B2 | 1/2015 | Boomgarden et al. |
| 9,365,156 B2 | 6/2016 | Bachhuber et al. |
| 2007/0236926 A1 | 10/2007 | Guard et al. |
| 2018/0327096 A1 | 11/2018 | Lins |

OTHER PUBLICATIONS

European Search Report for Application No. 19205360.1, dated May 4, 2020, 7 pages.

*Primary Examiner* — Robert J May
(74) *Attorney, Agent, or Firm* — Cantor Colburn LLP (57) ABSTRACT

An aircraft passenger reading light include comprises: a light source arrangement having a plurality of rows of reading light sources, with each of the rows having a plurality of reading light sources for passenger-specific illumination of a plurality of seats of a seating row of an aircraft and with the plurality of rows having different illumination directions in a longitudinal direction (L) of the aircraft, whereinach of the light sources first and second electrical terminals; first and second power supply connectors; and a multi-state switching arrangement having a plurality of switching states. The first power supply connector is coupled to the first electrical terminals of the plurality of reading light sources. The second power supply connector is coupled to the second electrical terminals of the plurality of reading light sources via the multi-state switching arrangement.

15 Claims, 6 Drawing Sheets

AIRCRAFT PASSENGER READING LIGHT

FOREIGN PRIORITY

This application claims priority to European Patent Application No. 19205360.1 filed Oct. 25, 2019, the entire contents of which is incorporated herein by reference.

TECHNICAL FIELD

The present invention is in the field of aircraft passenger reading lights. The present invention is in particular related to aircraft passenger reading lights which may be employed in different types of aircraft.

BACKGROUND

Passenger aircraft, such as commercial airplanes, usually have a passenger cabin comprising a plurality of passenger seats and passenger reading lights arranged above the passenger seats, in order to allow passengers sitting in the passenger seats to read even if the illumination within the passenger cabin is dimmed low or switched off.

In order to provide a convenient illumination to the passengers, the aircraft passenger reading lights are adapted to the geometry of the passenger cabin of the aircraft in which they are to be installed. They are in particular adapted to the spatial relation between the aircraft passenger reading light and the passenger seat which is to be illuminated.

It would be beneficial to provide aircraft passenger reading lights which may be adapted easily to different geometries of the passenger cabin, in order to allow using a single type of aircraft passenger reading light in different types of passenger cabins, in particular in passenger cabins with different passenger seat configurations.

SUMMARY

According to an exemplary embodiment of the invention, an aircraft passenger reading light comprises a light source arrangement having a plurality of rows of reading light sources, with each of the rows having a plurality of reading light sources for passenger-specific illumination of a plurality of seats of a seating row of an aircraft and with the plurality of rows having different illumination directions in a longitudinal direction of the aircraft. Each of the plurality of reading light sources comprises a first electrical terminal and a second electrical terminal. The aircraft passenger reading light further comprises a first power supply connector and a second power supply connector for coupling the aircraft passenger reading light to an aircraft on-board power supply; and a multi-state switching arrangement having a plurality of switching states. The first power supply connector is coupled to the first electrical terminals of the plurality of reading light sources, and the second power supply connector is coupled to the second electrical terminals of the plurality of reading light sources via the multi-state switching arrangement. Each of the plurality of switching states permanently couples the second electrical terminals of the reading light sources of a single one of the plurality of rows to the second power supply connector and permanently de-couples the second electrical terminals of the reading light sources of the other rows from the second power supply connector.

Exemplary embodiments of the invention also include a method of configuring an aircraft passenger reading light according to an exemplary embodiment of the invention, wherein the method includes establishing a permanent coupling configuration between the second power supply connector and the second electrical terminals of the plurality of reading light sources via selecting a particular one of the plurality of switching states of the multi-state switching arrangement. Each of the plurality of switching states permanently couples the second electrical terminals of the reading light sources of a single one of the plurality of rows to the second power supply connector and permanently de-couples the second electrical terminals of the reading light sources of the other rows from the second power supply connector.

By coupling only the reading light sources of a single one of the plurality of rows to the second power supply connector, the light emission provided by the aircraft passenger reading light may be modified and adjusted to different geometries within the passenger cabin. The light emission provided by the aircraft passenger reading light may in particular be adjusted to different seat configurations within the passenger cabin, in particular to different distances between adjacent rows of passenger seats. Thus, the same type of aircraft passenger reading light may be employed in combination with a plurality of different passenger cabin configurations. A single type of aircraft passenger reading light may be produced in large numbers and be installed in different types of aircraft. As a result, the production costs for each aircraft passenger reading light may be reduced, as compared to a situation in which individual types of aircraft passenger reading lights need to be produced for ever type of passenger cabin configuration.

The switching state of the multi-state switching arrangement may be set or changed only before the aircraft passenger reading light is installed within the passenger cabin of an aircraft or after the reading light has been de-installed from the passenger cabin or in specialized maintenance procedures. Thus, the switching state of the multi-state switching arrangement may be set or changed only in the factory, when the aircraft is assembled, or during maintenance of the aircraft, in particular when the configuration of the passenger cabin in modified. The switching state of the multi-state switching arrangement cannot be changed by passengers or the aircraft crew, as long as the aircraft passenger reading light is installed within the aircraft cabin. This prevents the aircraft passenger reading light from being switched accidentally into a state which does not correspond to the actual configuration of the passenger cabin. A switching tool, such as a screwdriver or a specifically designed switching tool, may be necessary for changing the switching state of the multi-state switching arrangement. Such a switching tool may be available only in the factory and/or the hangar where the aircraft is assembled and/or maintained.

The expression of the second electrical terminals of the reading light sources of a single one of the plurality of rows being permanently coupled to the second power supply connector does not require an ongoing current flow through the reading light sources of said single one of the plurality of rows. Rather, it means that a permanent circuit configuration is established that generally enables current flow through the reading light sources of said one row, which current flow may for example be additionally dependent on the passenger-specific illumination commands, as will be explained in more details below. The second terminals of the reading light sources of the other rows being permanently de-coupled from the second power supply connector means that a current flow through those reading light sources is not possible in regular operation of the aircraft. In particular, neither the passenger nor the crew nor any on-board control instance can effect power flow through the reading light sources of said other rows in regular operation of the aircraft. As discussed above, a re-configuration of the multi-state switching arrangement would be required for coupling a different row of reading light sources to the second power supply connector.

An aircraft passenger reading light according to an exemplary embodiment of the invention does in particular not comprise a seat position detection sensor or a seat position detection system, which is configured for detecting the current position of the passenger seat while the aircraft is operated. According to exemplary embodiments of the present invention, the switching state of the multi-state switching arrangement is set permanently, as it has been discussed before. The switching state is in particular not changed when the passenger seat, in particular the back rest of the passenger seat, is moved by a passenger in flight. Thus, there is no reason for providing a seat position detection sensor or a seat position detection system, detecting the current position of the passenger seat.

In an embodiment, the number of reading light sources in each row of reading light sources corresponds to the number of seats to be illuminated by a single aircraft passenger reading light. In particular, the number of reading light sources in each row may be two, three, four or five, corresponding to two, three, four or five passenger seats arranged next to each other in a single row, respectively. Such a configuration allows for illuminating all passenger seats arranged next to each other within a single row, i.e. all passengers seats between the outer wall of the passenger cabin and an aisle or all passenger seats between two aisles, with a single aircraft passenger reading light. In consequence, a small number of passenger reading lights is needed.

In an embodiment, the single aircraft passenger reading light further comprises a plurality of passenger command input terminals for receiving passenger-specific illumination commands. Each passenger command input terminal is functionally coupled to at least one associated reading light source per row of reading light sources. The power flow through the reading light sources depends on the switching state of the multi-state switching arrangement and the passenger-specific illumination commands. Such a configuration allows each passenger to switch the associated aircraft passenger reading light on and off according to his/her individual demands.

The at least one associated reading light source may be a single light source or a group of light sources, in particular a group of light sources arranged next to each other.

In an embodiment, the passenger-specific illumination commands establish or interrupt an electrical connection between the first power supply connector and the second power supply connector through the associated reading light source within the row of reading light sources "activated" by the multi-state switching arrangement. The associated at least one reading light source is addressed by the particular illumination command, in order to selectively activate or deactivate the at least one associated reading light source.

In an embodiment, the multi-state switching arrangement comprises a multi-way mechanical switch or a plug-connector, which is configured for selecting a particular one of the plurality of switching states. A multi-way mechanical switch and a plug-connector provide reliable multi-state switching arrangements which may be realized with low complexity and at low costs.

In an embodiment, the multi-state switching arrangement comprises at least one signal input terminal which allows selecting the switching state of the multistate switching arrangement by delivering an appropriate control signal to the at least one signal input terminal. The multi-state switching arrangement may in particular be an electromechanical and/or electronic multi-state switching arrangement. In an embodiment, the control signal is provided by an appropriate set-up tool, which is electrically connected to the at least one signal input terminal.

In an embodiment, the reading light sources are arranged on a common mounting plane. The plurality of rows of reading light sources may in particular be arranged on a common circuit board, for example on a common printed circuit board. Such a configuration allows for an easy assembly and installation of the reading light sources. The reading light sources may in particular be soldered to the circuit board for providing the necessary electrical connections.

In an embodiment, the aircraft passenger reading light further comprises a common optical system, in particular a common lens, which is arranged over the plurality of rows of reading light sources, i.e. on the side of the reading light sources opposite to the common mounting plane, so that the light emitted by the plurality of reading light sources passes though the optical system. When the aircraft passenger reading light is installed above the passenger seats within the passenger cabin of an aircraft, the common optical system is arranged below the reading light sources, in particular between the reading light sources and the passenger seats. The common optical system modifies the light emitted by the reading light sources, it in particular focuses the light emitted by the reading light sources, in order to provide a convenient illumination to the passengers sitting on the passenger seats and using the aircraft passenger reading light.

In an embodiment, the plurality of rows of reading light sources are spaced apart in the longitudinal direction of the aircraft. The different illumination directions of the plurality of rows of reading light sources in particular correspond to distances of between 20 cm and 40 cm on a seat pan height of the seating row of the aircraft. This allows adjusting the illumination provided by the aircraft passenger reading light to different distances between adjacent seat rows.

In an embodiment, the plurality of rows of reading light sources are three rows of reading light sources. Three rows of reading light sources provide a good compromise between the range, in which the illumination provided by the aircraft passenger reading light may be adjusted, and the complexity of the aircraft passenger reading light. Depending on the individual circumstances, the aircraft passenger reading light may comprise more, e.g. four or five, or fewer, i.e. two, rows of reading light sources.

In an embodiment, each of the reading light sources is an LED or comprises one or more LEDs, such as a group of LEDs, respectively. LEDs provide reliable and efficient light sources at low costs.

Exemplary embodiments of the invention further include an aircraft with a passenger cabin, comprising a plurality of passenger seats and a plurality of aircraft passenger reading lights, as described in any of the embodiments above, arranged above the passenger seats.

In an embodiment, the plurality of passenger seats are arranged in a plurality of rows and the second power supply connector of each aircraft passenger reading light is coupled to the second terminals of the reading light sources of only a single row of reading light sources, in order to select the reading light sources of this row as the only reading light sources to be switched on when the aircraft passenger reading light is operated.

In an embodiment, the row of reading light sources, coupled to the second power supply connector, is selected based on the distance between the respective aircraft passenger reading light and an associated row of passenger seats in the longitudinal direction, in order to adjust the characteristics of the light emitted by the aircraft passenger reading light to the distance between the respective aircraft passenger reading light and an associated row of passenger seats for providing a convenient illumination to the passengers.

In an embodiment, each row of reading light sources comprises a plurality of reading light sources and each of said reading light sources is associated with one of the seats of an associated row of passengers seats, in order to act as a reading light for the respectively associated passenger seat. Such a configuration allows illuminating multiple passenger seats arranged in a common row using only a single aircraft passenger reading light.

BRIEF DESCRIPTION OF THE DRAWINGS

Further exemplary embodiments of the invention will be described with respect to the accompanying drawings, wherein.

DETAILED DESCRIPTION

Figure 1:
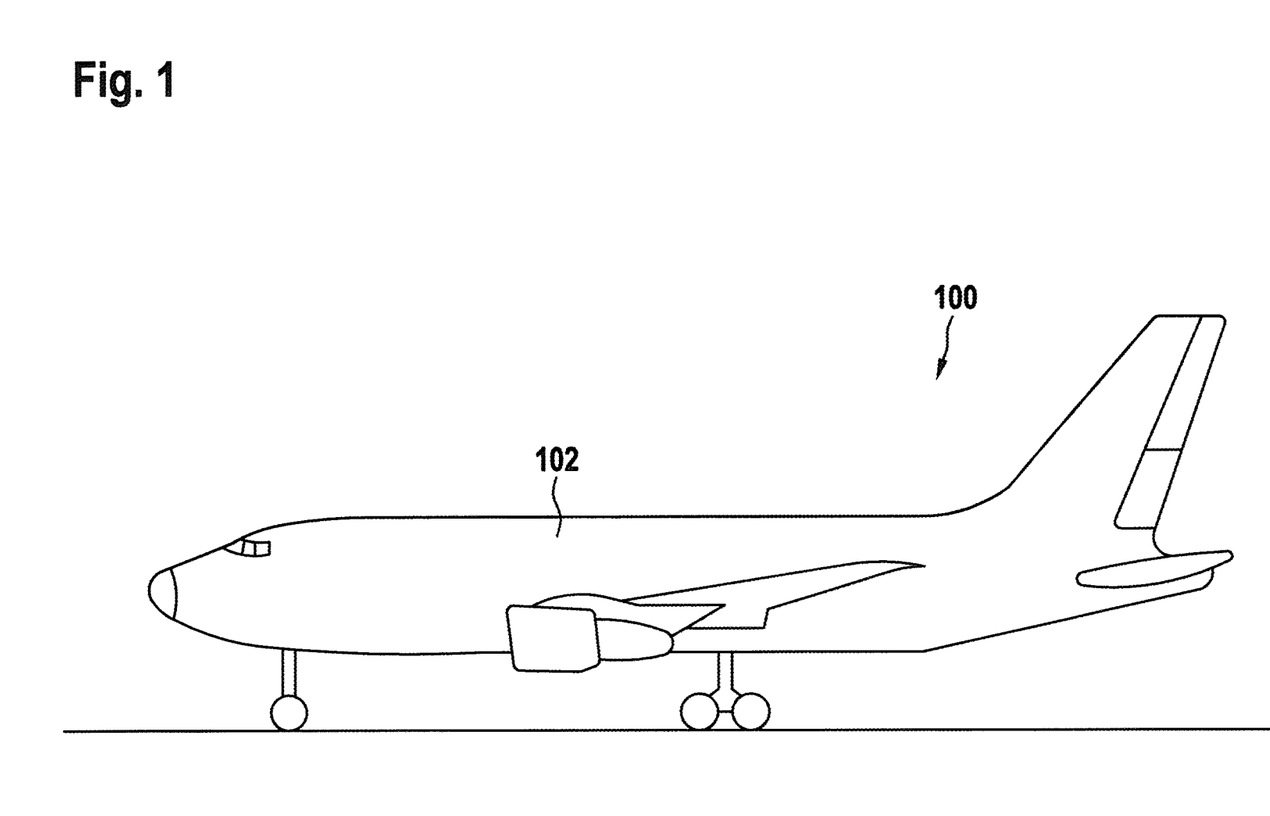
FIG. 1 shows a schematic side view of an aircraft in accordance with an exemplary embodiment of the invention having a passenger cabin.

FIG. 1 shows a schematic side view of an aircraft 100 with a passenger cabin 102.

Figure 2A:
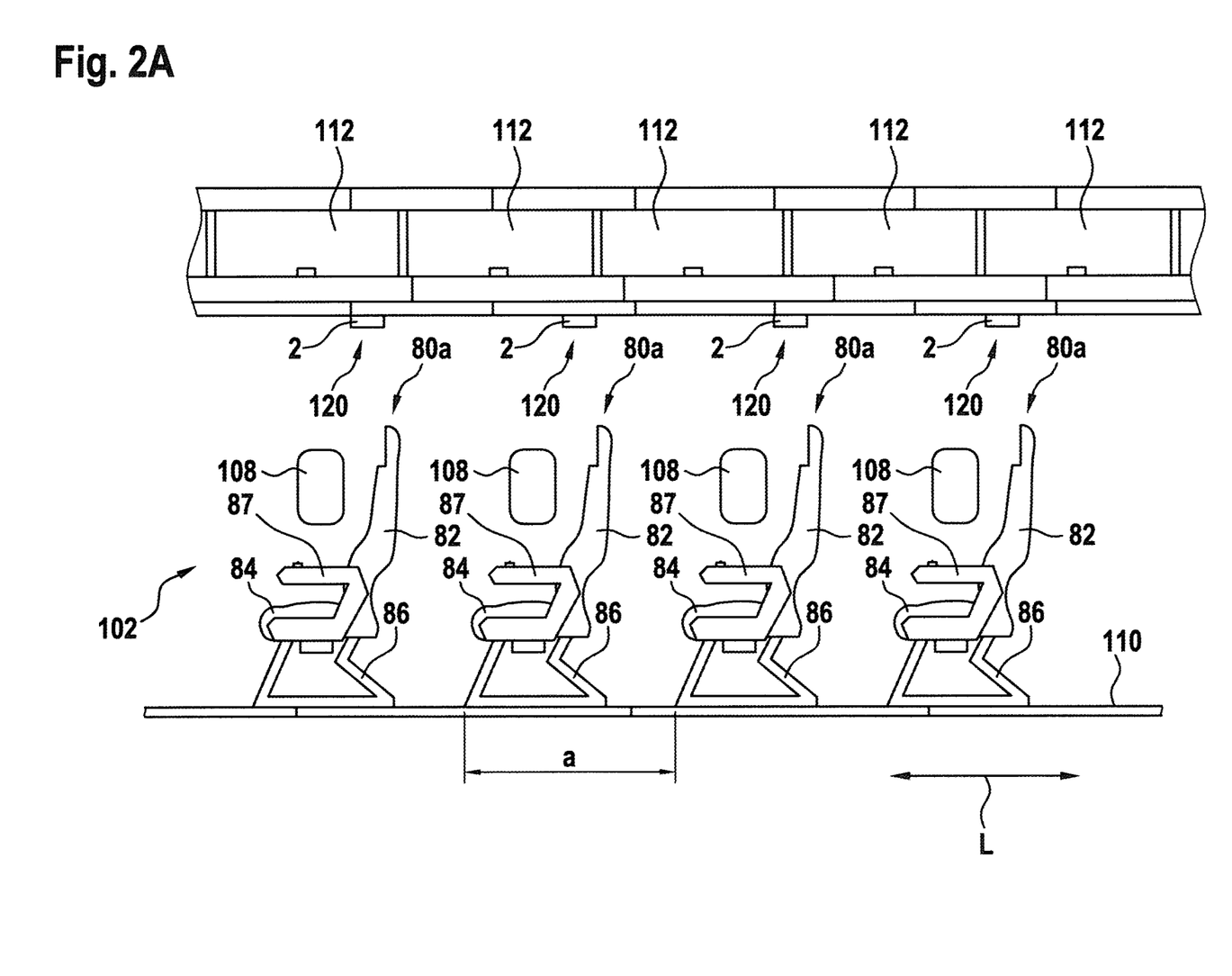
FIG. 2A shows a longitudinal cross-sectional view of a portion of the passenger cabin of the aircraft shown in FIG. 1.
Figure 2B:
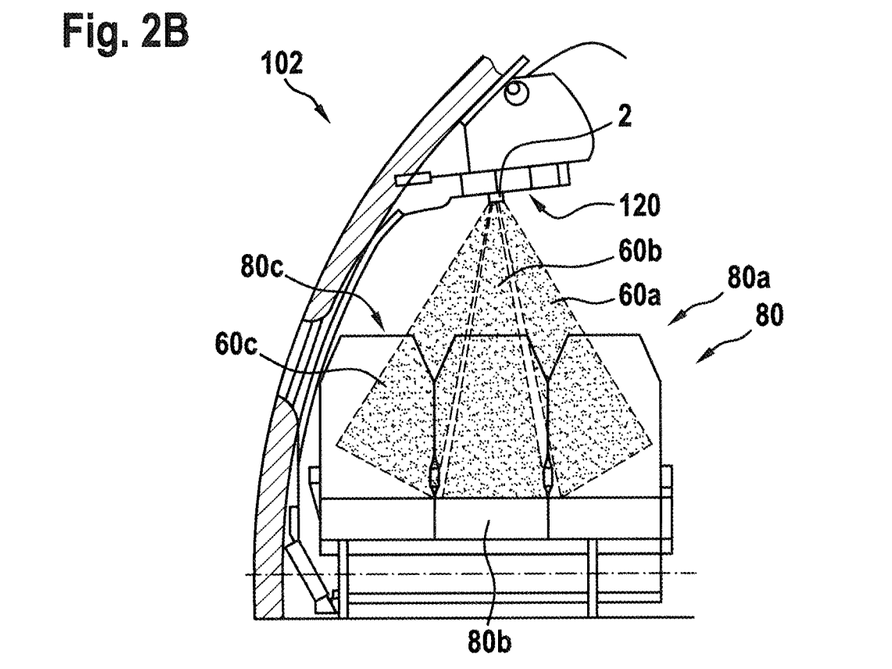
FIG. 2B shows a lateral cross-sectional view of a portion of the passenger cabin of the aircraft shown in FIG. 1.

FIG. 2A shows a longitudinal cross-sectional view of a portion of the passenger cabin 102 of the aircraft 100. FIG. 2B shows a partial cross-sectional view of the passenger cabin 102 in a plane which is oriented orthogonally to the longitudinal direction L.

Four seats 80a, also referred to as passenger seats 80a, are depicted in FIG. 2A. The passenger seats 80a are mounted to a floor 110 of the passenger cabin 102. Each of the depicted passenger seats 80a belongs to a different seating row 80. Each seating row 80 includes three passenger seats 80a, 80b, 80c (see FIG. 2B). The second and third passenger seats 80b, 80c are not visible in FIG. 2A, as they are arranged behind and therefore hidden by the depicted first passenger seats 80a.

For each of the seat rows 80, a window 108 is provided, which allows the passengers to view the outside of the aircraft 100. Further, a plurality of overhead baggage compartments 112 are shown, which provide storage space for baggage.

Each of the passenger seats 80a has a seat back (backrest) 82, a seat pan 84, a seat base 86, and an arm rest 87. The arm rest 87 may be pivotable around a horizontal axis. The seat base 86 supports the seat back 82 and the seat pan 84.

A passenger service unit (PSU) 120 is arranged above each of the seat rows 80, respectively. Each PSU 120 may comprise gaspers, loudspeakers, emergency oxygen masks and service call buttons, which are not shown in FIGS. 2A and 2B.

Each PSU 120 further comprises at least one switchable aircraft passenger reading light 2, providing individual reading illumination for each passenger sitting in one of the passenger seats 80a-80c, in order to allow the passengers to read even if the cabin light is dimmed down or switched-off.

The distance a between the rows 80 of passenger seats 80a-80c in the longitudinal direction L of the passenger cabin 102 may be different, depending on the demands of the airline operating the respective aircraft 100. For example, the rows 80 may be arranged in small distances a, in order to maximize the number of passengers fitting into the passenger cabin 102, when the aircraft is operated by a low cost airline. On the other hand, the distances a between the rows 80 of passenger seats 80a-80c may be set larger, in order to provide more comfort to the passengers, when the aircraft is operated by a premium airline.

For providing a convenient illumination to the passengers, the light outputs of the aircraft passenger reading lights 2 are adjusted to the positions of the passenger seats 80a-80c.

The possible positions of the PSUs 120 and thus the positions of the reading lights 2 being part of the PSUs 120 in the longitudinal direction L may be restricted by the ceiling structure of the passenger cabin 102. The ceiling structure may in particular not allow positioning the PSUs 120 at arbitrary positions along the longitudinal direction L, but only at a restricted number of predetermined positions. In prior approaches, in order to provide a convenient reading illumination for different distances a between adjacent rows 80 of passenger seats 80a-80c, different types of reading lights 2 having different light emission characteristics have been used. Also, different types of reading lights 2 have been used for providing convenient reading illumination for each of the different passenger seats 80a-80c in each seating row 80. Further, in cases where the seating rows were re-configured, the PSUs 120 have been moved and/or the reading lights have been replaced with different types of reading lights in prior approaches.

In order to reduce the number of different types of reading lights 2, an aircraft passenger reading light 2 according to an exemplary embodiment of the invention comprises a plurality of reading light sources 6 arranged in a plurality of rows 61, 62, 63, wherein each of the rows 61, 62, 63 corresponds to a different distance a between adjacent rows 80 of passenger seats 80a-80c.

Figure 3:
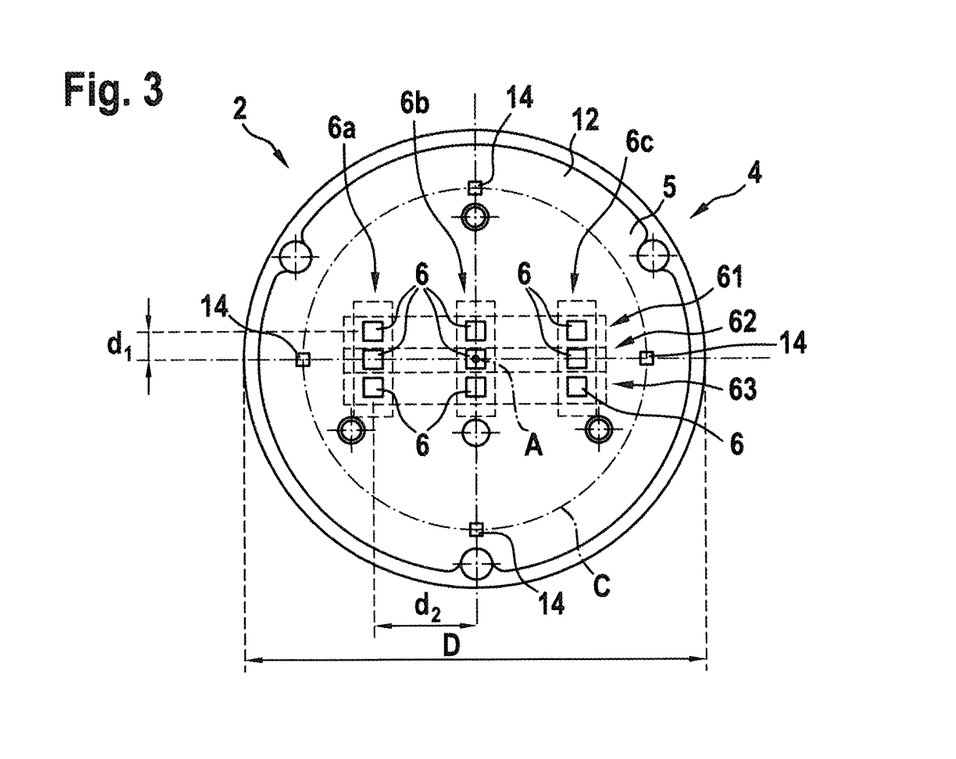
FIG. 3 shows a cross-sectional view of an aircraft passenger reading light according to an exemplary embodiment of the invention.

FIG. 3 depicts a cross-sectional view of an exemplary embodiment of such an aircraft passenger reading light 2. In the illustration depicted in FIG. 3, the cross-sectional plane is oriented basically horizontally, i.e. parallel to the floor 110 of the passenger cabin 102 when the aircraft passenger reading light 2 is installed within the passenger cabin 102 above the passenger seats 80a-80c, as it is depicted in FIGS. 2A and 2B.

Figure 4:
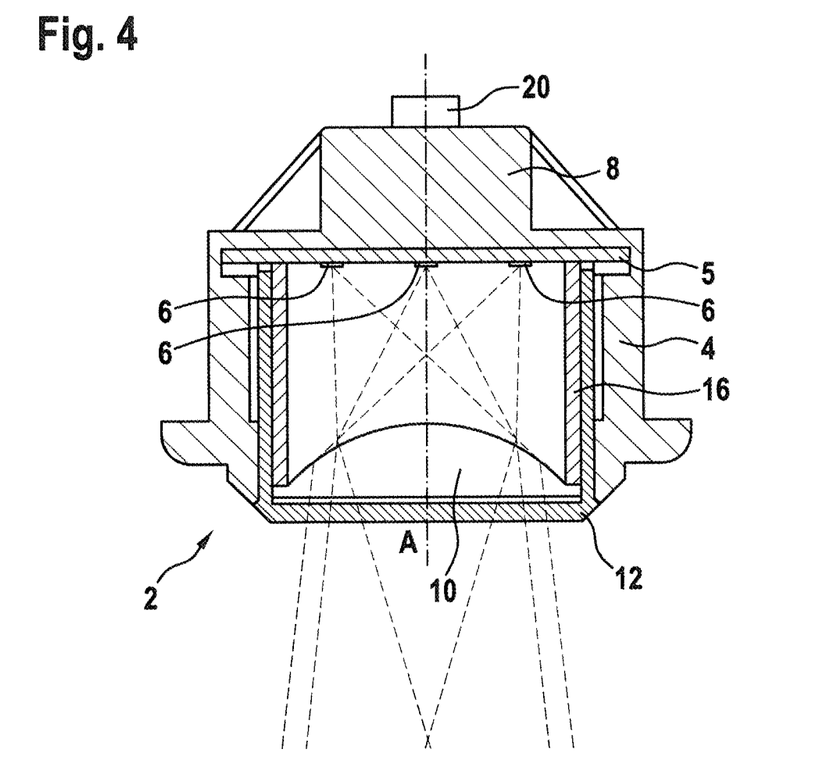
FIG. 4 shows another cross-sectional view of the aircraft passenger reading light shown in FIG. 3.

FIG. 4 depicts a cross-sectional view of the aircraft passenger reading light 2 shown in FIG. 3, wherein the cross-sectional plane is oriented vertically, i.e. orthogonally to the cross-sectional plane of FIG. 3.

The aircraft passenger reading light 2 has a cylindrical housing 4 extending with a diameter D of, for example, 40 mm to 50 mm, in particular a diameter D of 45 mm, around a central axis A. When the aircraft passenger reading light 2 is installed within the passenger cabin 102, the central axis A is oriented basically vertically, i.e. orthogonally to the floor 110.

A planar circuit board 5, in particular a printed circuit board (PCB) 5, is arranged within the housing 4. The circuit board 5 extends basically orthogonally to the central axis A and supports a plurality of reading light sources 6. The reading light sources 6 are arranged in a rectangular matrix configuration, comprising three rows 61, 62, 63 and three columns 6a, 6b, 6c, respectively.

The distance d1 between the rows 61, 62, 63 may be in the range from 2 mm to 5 mm, it in particular may be 3 mm; and the distance d2 between the columns 6a, 6b, 6c may be in the range from 9 mm to 15 mm, it in particular may be 11 mm.

Each of the columns 6a, 6b, 6c is associated with one of the passenger seats 80a-80c in each seating row 80; i.e. in an exemplary configuration, the reading light sources 6 in the first column 6a are configured for providing reading illumination 60a for an aisle seat 80a, the reading light sources 6 in the second column 6b are configured for providing reading illumination 60b for a middle seat 80b, and the reading light sources 6 in the third column 6c are configured for providing reading illumination 60c for a window seat 80c (cf. FIG. 2B).

Further, each of the rows 61, 62, 63 of reading light sources 6 is associated with a different distance in the longitudinal direction L between the aircraft passenger reading light 2 and the corresponding seating row 80, corresponding to a different distance a between adjacent rows 80 of passengers seats 80a-80c. Providing a plurality of rows 61, 62, 63 of reading light sources 6 allows for using the same aircraft passenger reading light 2 for different passenger seat arrangements. It in particular allows for using the same aircraft passenger reading light 2 in combination with passenger seat arrangements having different distances a between adjacent rows 80 of passenger seats 80a-80c. This feature will be discussed in more detail further below. Also, the different rows 61, 62, 63 of reading light sources 6 may allow for using the same aircraft passenger reading light 2 in cases where the mounting position of the PSU is constrained to somewhat in front of or somewhat behind the seating row in the longitudinal direction L of the aircraft. Further, the different rows 61, 62, 63 of reading light sources 6 may allow for leaving the aircraft passenger reading light 2 in the same position, when the seating rows are re-arranged at some point during the life cycle of the aircraft, thus keeping the re-configuration efforts low.

Referring to the cross-sectional view depicted in FIG. 4, a heat sink 8, which is configured for dissipating the heat generated by operating the reading light sources 6, is mounted to the circuit board 5. The heat sink 8 is in particular attached to a rear side of the circuit board 5, i.e. to the side opposite to the reading light sources 6.

An optical system 10, including at least one optical lens, is arranged within the path of light emitted by the reading light sources 6. A transparent cover 12 closes the housing 4, but allows the light emitted by the reading light sources 6 to pass through.

The exemplary embodiment of the aircraft passenger reading light 2 depicted in FIGS. 3 and 4 further comprises a plurality of, in particular four, optional ambient light sources 14. The ambient light sources 14 are arranged outside the reading light sources 6, i.e. at a larger distance from the central axis A of the circuit board 5 than the reading light sources 6. In the depicted embodiment, four ambient light sources 14 are arranged in equal angular distances of 90° on a virtual circle C, centered around the central axis A of the circuit board 5.

As shown in FIG. 4, a cylindrical shutter 16 is arranged between the reading light sources 6 and the ambient light sources 14, separating light emitted by the reading light sources 6 from light emitted by the ambient light sources 14. The shutter 16 further prevents the light, emitted by the ambient light sources 14, from passing through the optical system 10. The ambient light sources 14 are controlled independently of the reading light sources 6 and allow using the aircraft passenger reading light 2 for providing ambient illumination within the passenger cabin 102. The ambient light sources 14 may also be used for additional functionality of the aircraft passenger reading light 2, such as for implementing a visual crew call signal. The ambient light sources 14, however, are optional and do not necessarily need to be included in aircraft passenger reading lights 2 according to exemplary embodiments of the invention.

An aircraft passenger reading light 2 according to an exemplary embodiment of the invention further comprises a multi-stage switching arrangement 20. The multi-stage switching arrangement 20 allows for configuring the aircraft passenger reading light 2 to selectively operate only one of the plurality of rows 61, 62, 63 of reading light sources 6, e.g. depending on the distances a between adjacent rows 80 of passenger seats 80a-80c in the longitudinal direction L. The multi-stage switching arrangement 20 may be arranged on the circuit board 5, or may be arranged entirely or in part outside the housing 4, as exemplarily depicted in FIG. 4.

Figure 5:
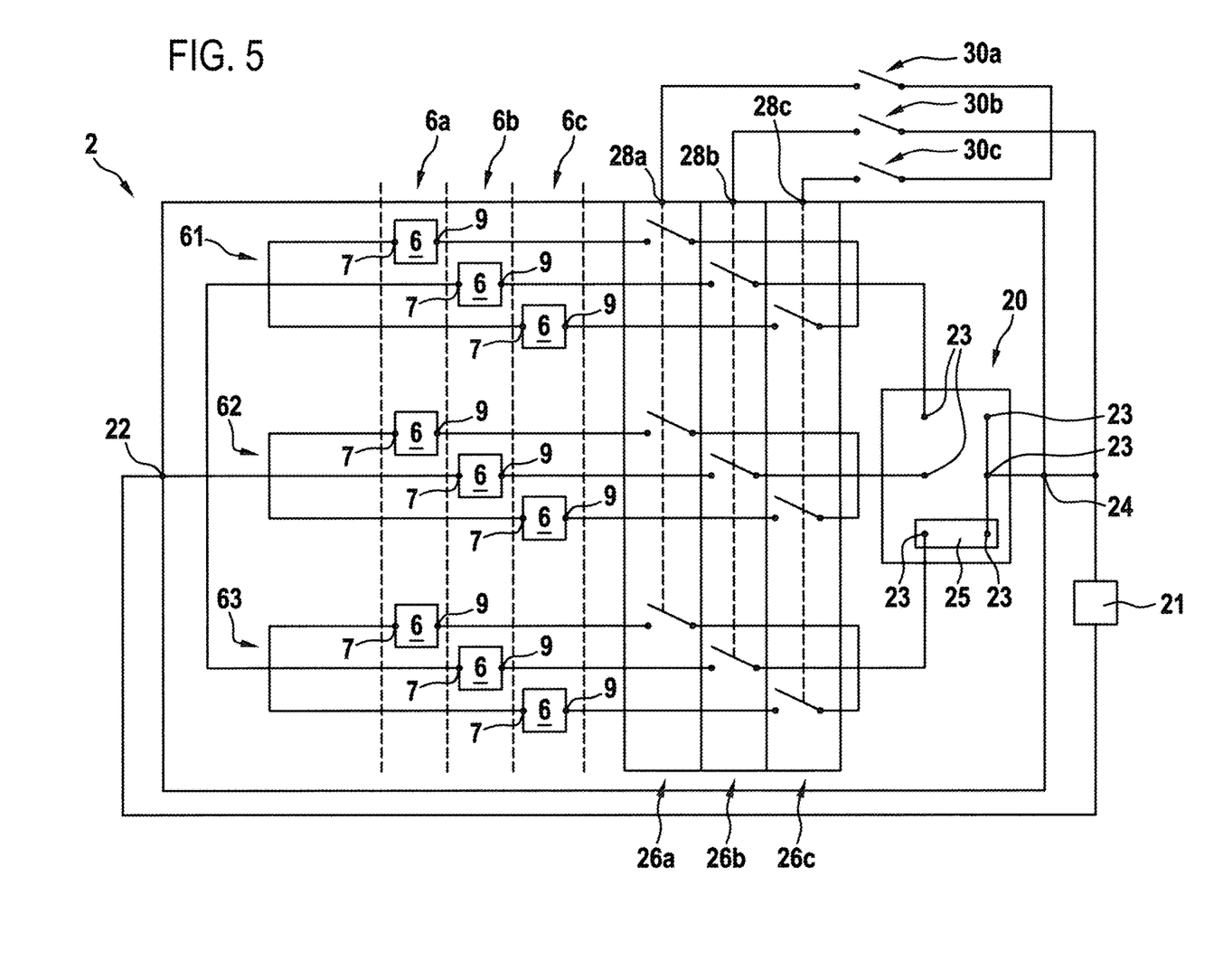
FIG. 5 shows a schematic circuit diagram of an aircraft passenger reading light according to an exemplary embodiment of the invention.

FIG. 5 shows a schematic circuit diagram of an aircraft passenger reading light 2 according to an exemplary embodiment of the invention.

The aircraft passenger reading light 2 comprise a first power supply connector 22 and a second power supply connector 24 which are configured for being connected with an electrical aircraft on-board power supply 21 of the aircraft 100. Each of the reading light sources 6 comprises a first electrical terminal 7 and a second electrical terminal 9, respectively. The first electrical terminals 7 of all reading light sources 6 are electrically connected to the first power supply connector 22.

The second electrical terminals 9 of the reading light sources 6 are connected to the second power supply connector 24 via the multi-stage switching arrangement 20. The multi-stage switching arrangement 20 is configured for selectively connecting only the second electrical terminals 9 of the reading light sources 6 of a selected single row 61, 62, 62 of reading light sources 6 electrically with the second power supply connector 24.

This selection of a single row 61, 62, 62 of reading light sources 6 is done before or at the time the aircraft passenger reading light 2 is installed within the passenger cabin 102 of the aircraft 100. The single one of the rows 61, 62, 62 of reading light sources 6 is selected in dependence of the position of the aircraft passenger reading light 2 with respect to the associated seating row 80. The selection is in particular made in dependence of the distance between the aircraft passenger reading light 2 and the associated seating row 80 in the longitudinal direction L of the passenger cabin 102, in order to provide an optimized illumination of the associated passenger seats 80a-80c.

Figure 6:
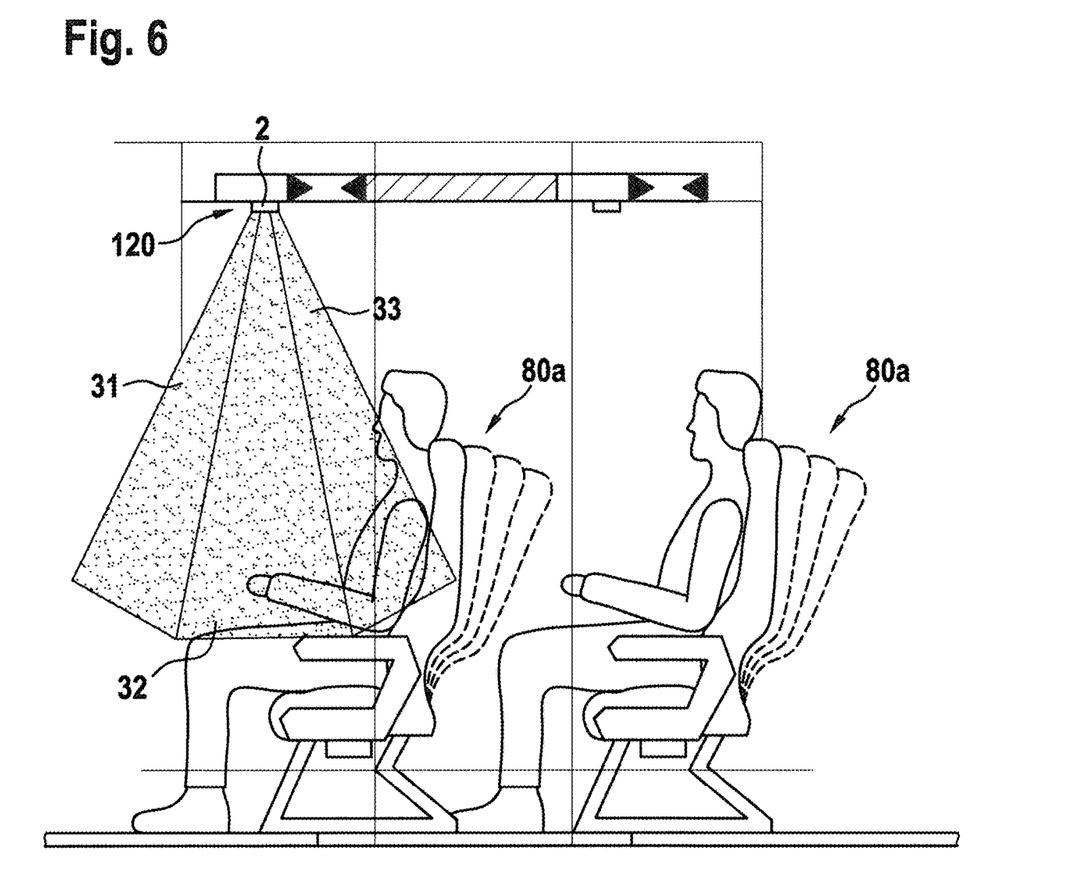
FIG. 6 schematically shows a cross-sectional view through the passenger cabin with three light cones emitted by an aircraft passenger reading light according to an exemplary embodiment of the invention.

FIG. 6 schematically shows three light cones 31, 32, 33, which are emitted by the reading light sources 6 of the respective rows 61, 62, 63 of the aircraft passenger reading light 2 according to an exemplary embodiment of the invention. For illustrative purposes, all three light cones 31, 32, 33 are shown in FIG. 6. However, in reality, only the reading light source 6 generating one of the light cones 31, 32, 33, in particular the light cone 31, 32, 33 providing the best illumination for the respective configuration of passenger seats 80a-80c, will be activated. I.e., only one of the light cones 31, 32, 33 will be generated, when the aircraft passenger reading light 2 is installed and operated within the passenger cabin 102 of an aircraft 100.

The multi-state switching arrangement 20 is configured for permanently coupling the second power supply connector 22 of the aircraft passenger reading light 2 to the second electrical terminals 9 of the reading light sources 6 of the selected row 61, 62, 63 of reading light sources 6. In the context of the present invention, "permanently coupling" means that the selected connections are established once before or when the aircraft passenger reading lights 2 are installed in the passenger cabin 102 of the aircraft 100 and that they are usually not changed after the aircraft passenger reading lights 2 have been installed in the passenger cabin 102. The selected connections in particular cannot be changed by passengers and/or the crew of the aircraft 100 during normal operation of the aircraft 100. The established connections, however, may be changed during maintenance of the aircraft 100, in particular when the seat configuration within the passenger cabin 102 is changed, resulting in different distances between the aircraft passenger reading lights 2 and the associated passenger seats 80a-80c in the longitudinal direction of the aircraft.

The multi-state switching arrangement 20 may include a mechanical switch or a plurality of mechanical switches, which is/are switchable before or when the aircraft passenger reading light 2 is installed within the passenger cabin 102, but which is/are not readily accessible after the aircraft passenger reading light 2 has been installed within the passenger cabin 102. The mechanical switch(es) in particular may be operable only with the assistance of an appropriate switching tool, such as a screwdriver or a specific switching tool, similar to a key, which is specifically designed for switching the mechanical switch(es).

In an alternative configuration, the multi-state switching arrangement 20 may comprise a plurality of pins 23, electrically connected with the second electrical terminals 9 and the second power supply connector 24, respectively, and at least one plugable electrical plug-connector ("jumper") 25, which is configured to be put onto two adjacent pins 23 for providing an electrical connecting between these two pins 23.

In another alternative configuration, the multi-state switching arrangement 20 may be an electrically switchable multi-state switching arrangement 20, in particular an electromechanical and/or electronic multi-state switching arrangement 20, which may be switched into the desired configuration by applying an appropriate control signal ("configuration signal") to the multi-state switching arrangement 20 before or when the aircraft passenger reading light 2 is installed within the passenger cabin 102.

Said configuration signal may be provided by an appropriate set-up tool, which is available in the factory and during maintenance of the aircraft 100, but not in the course of normal operation of the aircraft 100. In consequence, the configuration of the multi-state switching arrangement 20 may be set and changed only in the factory and/or during maintenance/reconfiguration of the aircraft 100.

The aircraft passenger reading light 2 further comprises a plurality of switching devices 26a, 26b, 26c, which allow selectively switching the individual reading light sources 6 of the selected row 61, 62, 63 of reading light sources 6.

A switching device 26a, 26b, 26c is associated with each of the columns 6a, 6b, 6c of reading light sources 6, respectively. In consequence, the reading light sources 6 of each column 6a, 6b, 6c may be switched on and off by operating the respectively associated switching device 26a, 26b, 26c. Each switching device 26a, 26b, 26c comprises a passenger command input terminal 28a, 28b, 28c for receiving an input command from a passenger switch 30a, 30b, 30c associated with the respective passenger seat 80a, 80b, 80c.

The passenger switches 30a, 30b, 30c may be located next to the aircraft passenger reading light 2 within the PSU 120 above the passenger seats 80a, 80b, 80c, or in the armrests 87 of the respective passenger seat 80a, 80b, 80c, or on a touch screen on the back side of a passenger seat in front of the respective passenger seat 80a, 80b, 80c, or in any other location that is conveniently accessible for the passenger.

In an aircraft passenger reading light 2 according to the present invention, as it has been described before, the reading light sources 6 are controlled by the multi-state switching arrangement 20 in combination with the passenger switches 30a, 30b, 30c as follows:

Before or when the aircraft passenger reading light 2 is installed within the passenger cabin 102 of the aircraft 100, one of the rows 61, 62, 63 of reading light sources 6 is selected by configuring the multi-state switching arrangement 20, so that it couples only the second electrical terminals 9 of the reading light sources 6 of a single one of the rows 61, 62, 63 with the second power supply connector 24. The configuration of the multi-state switching arrangement 20 remains in this established configuration, after the aircraft passenger reading light 2 has been installed within the passenger cabin 102 of the aircraft 100.

The columns 6a, 6b, 6c of the arrangement of reading light sources 6 correspond to the different passenger seats 80a, 80b, 80c within a single seating row 80. The reading light sources 6 of the previously selected row 61, 62, 63 of reading light sources 6 may be selectively and individually switched on and off by the passengers by operating the corresponding passenger switches 30a, 30b, 30c. Every passenger controls only the reading light sources 6 arranged in the column 6a, 6b, 6c associated with his/her passenger seat 80a, 80b, 80c. In consequence, only the reading light source 6 arranged in the pre-selected row 61, 62, 63 and in the column which is connected with the respective passenger switch 30a, 30b, 30c is switched on or off, when one of the passenger switches 30a, 30b, 30 is operated.

Aircraft passenger reading lights 2 according to exemplary embodiments of the invention may be adjusted to different longitudinal distances between the aircraft passenger reading lights 2 and the associated passenger seats 80 by setting the multi-state switching arrangement 20 appropriately. In consequence, aircraft passenger reading lights 2 according to exemplary embodiments of the invention may be adjusted to different distances between adjacent rows of passenger seats 80 within a passenger cabin 102 of an aircraft 100, without having to change the positions of the aircraft passenger reading lights 2.

As a result, the same type of aircraft passenger reading lights 2 may be employed in different types of passenger cabins 102, so that the number of different types of aircraft passenger reading lights 2, which need to be produced, may be reduced. Thus, the same type of aircraft passenger reading lights 2 may be produced in large numbers at low costs. Also, re-configurations of the seating layout of aircraft cabins may be made without having to change the positions of the aircraft passenger reading lights 2.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An aircraft passenger reading light, comprising:
   a light source arrangement having a plurality of rows of reading light sources, with each of the rows having a plurality of reading light sources for passenger-specific illumination of a plurality of seats of a seating row of an aircraft and with the plurality of rows having different illumination directions in a longitudinal direction (L) of the aircraft, wherein each of the plurality of reading light sources comprises a first electrical terminal and a second electrical terminal;
   a first power supply connector and a second power supply connector for coupling the aircraft passenger reading light to an aircraft on-board power supply; and
   a multi-state switching arrangement having a plurality of switching states;
   wherein the first power supply connector is coupled to the first electrical terminals of the plurality of reading light sources; and
   wherein the second power supply connector is coupled to the second electrical terminals of the plurality of reading light sources via the multi-state switching arrangement, with each of the plurality of switching states permanently coupling the second electrical terminals of the reading light sources of a single one of the plurality of rows to the second power supply connector and permanently de-coupling the second electrical terminals of the reading light sources of the other rows from the second power supply connector.

2. The aircraft passenger reading light according to claim 1, further comprising:
   a plurality of passenger command input terminals for receiving passenger-specific illumination commands, with each passenger command input terminal being coupled to an associated reading light source per row of reading light sources, with power flow through the reading light sources depending on the switching state of the multistate switching arrangement and the passenger-specific illumination commands.

3. The aircraft passenger reading light according to claim 1, the multi-state switching arrangement comprises a multiway mechanical switch or a plug-connector, which is configured for selecting a particular one of the plurality of switching states.

4. The aircraft passenger reading light according to claim 1, wherein the plurality of rows of reading light sources are arranged on a common mounting plane, in particular arranged on a common circuit board, further in particular arranged on a common printed circuit board.

5. The aircraft passenger reading light according to claim 1, further comprising a common optical system, in particular a common lens, arranged over the plurality of rows of reading light sources.

6. The aircraft passenger reading light according to claim 1, wherein the plurality of rows of reading light sources are spaced apart in the longitudinal direction (L) of the aircraft.

7. The aircraft passenger reading light according to claim 1, wherein the different illumination directions of the plurality of rows of aircraft passenger reading lights correspond to distances of between 20 cm and 40 cm on a seat pan height of the seating row of the aircraft.

8. The aircraft passenger reading light according to claim 1, wherein the plurality of rows of reading light sources are three rows of reading light sources, and/or wherein each of the rows of reading light sources has between two and four reading light sources, in particular three reading light sources.

9. The aircraft passenger reading light according to claim 1, wherein the reading light sources are LEDs.

10. The aircraft passenger reading light according to claim 1, wherein the aircraft passenger reading light is free of a seat position detection sensor or a seat position detection system.

11. An aircraft with a passenger cabin comprising:
    a plurality of passenger seats; and
    a plurality of aircraft passenger reading lights in accordance with claim 1, arranged above the passenger seats.

12. The Aircraft according to claim 11, wherein the plurality of passenger seats arranged in a plurality of rows and wherein the second power supply connector of each aircraft passenger reading light is coupled to the second terminals of the reading light sources of only a single row of reading light sources.

13. The aircraft with a passenger cabin according to claim 12, wherein the row of reading light sources, coupled to the second power supply connector, is selected based on the distance between the respective aircraft passenger reading light and an associated row of passenger seats.

14. The aircraft with a passenger cabin according to claim 13, wherein each row of reading light sources comprises a plurality of reading light sources and each of said reading light sources is associated with one of the seats of an associated row of passengers seats, in order to act as a reading light for the respectively associated passenger seat.

15. A method of configuring an aircraft passenger reading light according to claim 1, the method comprising:
    establishing a permanent coupling configuration between the second power supply connector and the second electrical terminals of the plurality of reading light sources
    wherein establishing includes selecting a particular one of the plurality of switching states of the multi-state switching arrangement, and
    wherein each of the plurality of switching states permanently couples the second electrical terminals of the reading light sources of a single one of the plurality of rows to the second power supply connector and permanently de-couples the second electrical terminals of the reading light sources of the other rows from the second power supply connector.

* * * * *